United States Patent [19]

Nakabayashi

[11] Patent Number: 4,992,826
[45] Date of Patent: Feb. 12, 1991

[54] CONTACT EXPOSURE APPARATUS
[75] Inventor: Hiromitsu Nakabayashi, Hino, Japan
[73] Assignee: Konica Corporation, Tokyo, Japan
[21] Appl. No.: 418,547
[22] Filed: Oct. 10, 1989
[30] Foreign Application Priority Data Oct. 13, 1988 [JP] Japan .................. 63-260336

[51] Int. Cl.⁵ .............................................. G03B 27/20
[52] U.S. Cl. .................................... 355/84; 355/91
[58] Field of Search ............ 355/84, 118, 129, 71, 355/91, 93, 92

[56] References Cited
U.S. PATENT DOCUMENTS 2,988,979  6/1961  Sigler ...................................... 355/84
4,641,958  2/1987  Wally et al. ........................... 355/71
4,707,116 11/1987  Newiger et al. .................... 355/84 X

*Primary Examiner*—L. T. Hix
*Assistant Examiner*—D. Rutledge
*Attorney, Agent, or Firm*—Jordan B. Bierman

[57] ABSTRACT

In a contact exposure apparatus, a film original is overlaid on a photosensitive material, a transparent cover sheet is covered on the film original, the film original and the photosensitive material are brought into contact with each other by vacuum suction, and the film original is exposure-scanned by an exposure unit through the transparent cover sheet. The exposure unit includes a honeycomb board for collimating light emitted from a light source.

21 Claims, 9 Drawing Sheets

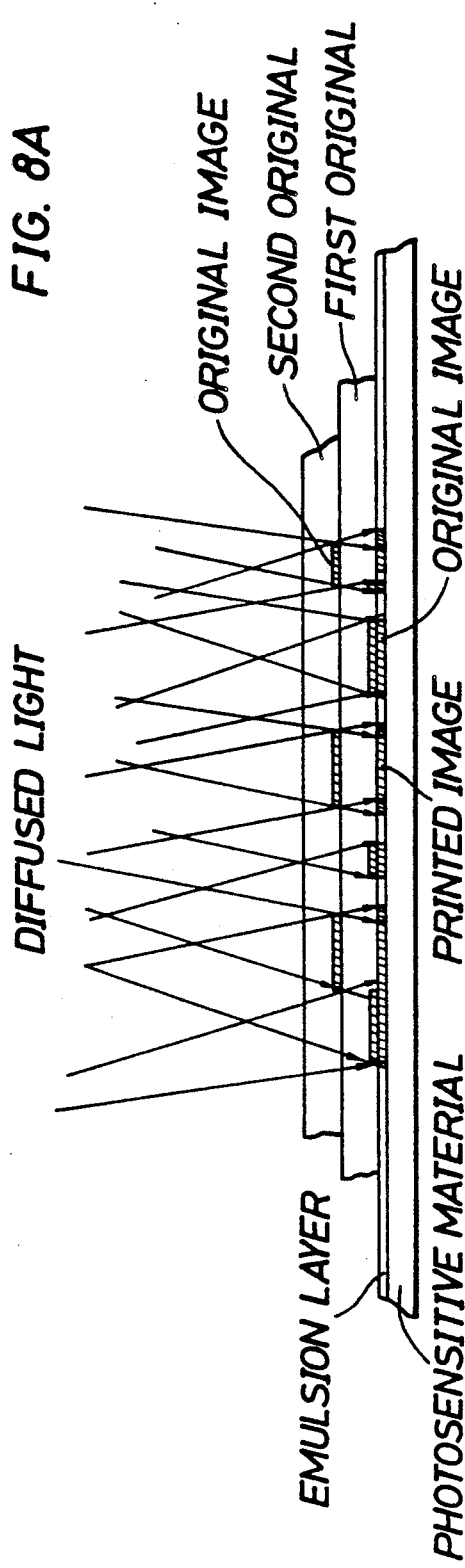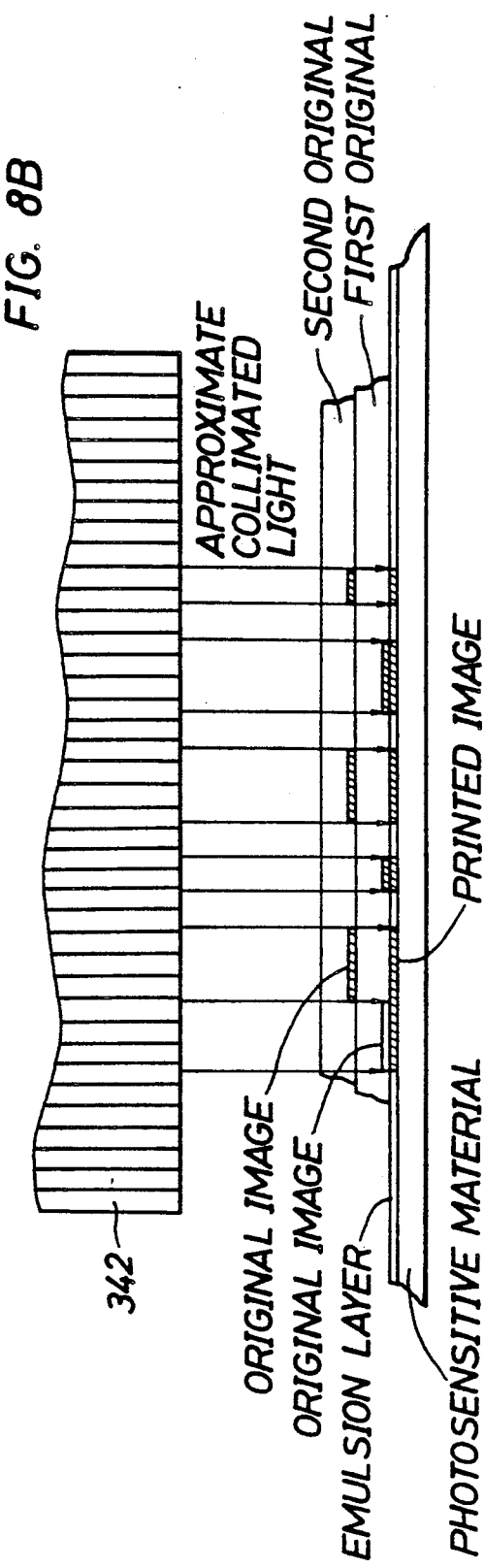

CONTACT EXPOSURE APPARATUS

BACKGROUND OF THE INVENTION

1. Field of the Invention

The present invention relates to a contact exposure apparatus suitable for forming a proof (color proof) in the field of printing process.

2. Description of the Prior Art

In the field of printing process, a large amount of film is used in a step of forming a printing plate consisting of halftone images from a continuous-tone image such as a reversal film, a color negative film or color paper, thereby separating colors and synthesizing an image. For this reason, the work procedures are complex to cause many failures such as character and layout errors. In addition, since a client irregularly requests changes in characters (e.g., prices), layout, colors or the like, an operator tends to forget to perform some of these changes. Also, whether a printed material has a desired color tone and gradation must be checked beforehand. All these checks are included in so-called "proofing".

For this purpose, in addition to a trial print called a "proof", a variety of systems are now commercially available. Examples are a CRT system, a system using a non-silver photosensitive material such as a photopolymer or diazo, a system in which an image is formed by a dry toner, and an electrophotography system. All these proofing systems, however, require a long time period to complete one color proof. In addition, a material cost is high and workability is poor. Therefore, the above systems are not satisfactory in practical use.

Another method of forming a color proof prints a color-separated halftone original on a color photosensitive material by color-separated light. For example, Japanese Unexamined Patent Publication (Kokai) No. 62-280746 discloses a method of obtaining a color proof on a color photosensitive material by a photographing system using a projection lens. Although an apparatus for use in such a method is large in size, it is designed to satisfy a so-called "roomlight specification" in which an operation can be performed in an ordinary room. That is, since a photosensitive material is kept inside the apparatus, exposure need not be performed in a darkroom but can be performed under normal illumination. Therefore, color proofing can be easily performed in a short time period at low cost to realize characteristics superior to those of the other proofing systems. Since the method utilizes the photographing system, however, an operation is adversely affected by flare or the like of a lens to degrade the gradation reproducibility. That is, by the flare or the like, a small-dot portion of a halftone image tends to be omitted, and its large-dot portions tend to become continuous.

Another method of forming a color proof from a color photosensitive material is a contact exposure system of an enlarge type such as "The Carlson Proofmaster System" (tradename) available from Chesley F. Carlson Company or a "Color Proofing System" (tradename) available from Kreonit, Inc. In these systems, a color-separated halftone film original is directly brought into contact with and exposed on a color photosensitive material. Therefore, the gradation reproducibility is largely improved as compared with that of the photographing system. The above systems, however, cannot be handled under roomlight because a color photosensitive material has a photosensitive range in the overall visible range. Therefore, an operator is forced to perform an operation in a darkroom. In addition, since a large light source device is necessary, an installation space of the apparatus must be increased and its operation is not easy. In this case, a compact light source may be used if a uniform slit beam is scanned to expose the entire surface so that the entire surface of an image forming region to be contact-exposed is uniformly exposed.

The present inventors proposed a color proof formation apparatus in U.S. Ser. No. 285,937. In this apparatus, a film original is overlaid on a photosensitive material, and they are set on an exposure table. Thereafter, a transparent cover sheet is covered on the film original, so that the film original is brought into contact with the photosensitive material through the cover sheet in vacuum. Exposure printing is then performed from the side of the cover sheet. This apparatus employs the contact exposure system, is compact, and allows roomlight operations.

In a scanning exposure apparatus such as a copier, parallelness and uniformity of light are not so important. In an apparatus for forming a color proof using a color-separated halftone original in the field of printing process, gradation reproducibility is an important problem. When a small-dot portion is omitted or large-dot portions become continuous, it is difficult to satisfactorily recognize reproducibility of the color-separated halftone original on a proof, and the reproducibility must be checked again using a film, resulting in a cumbersome operation. In addition, it is very difficult to recognize accurate image reproducibility and color reproducibility upon mixing of colors.

Furthermore, when a color-separated halftone original of a negative film is color-separation exposed on a negative color photosensitive material, one original film can be brought into contact with the photosensitive material. However, when a positive color-separated halftone original is color-separation exposed on a positive color photosensitive material, at least one of color plates (Y, M, and C plates), and a black plate, i.e., a total of two color-separated halftone films must be brought into contact with the photosensitive material. For this reason, one of the two color-separated halftone films is exposed on the photosensitive material through a base thickness corresponding to one film. Upon exposure of a positive color-separated halftone film for a printed material for which printing using a specific ink called "specific color" is simultaneously performed, two or more color-separated halftone films must be stacked and simultaneously exposed. In this system, parallelness and uniformity of light considerably influence reproducibility of an image. In particular, when parallelness is insufficient, satisfactory image reproducibility cannot be obtained even in contact exposure. More specifically, degradation of image quality such as formation of continuous dots, omission of dots, local fogging, or the like occurs due to dot fringes or the like. In particular, when a plurality of (two in FIG. 8A) originals are stacked and are directly exposed with diffused light from a light source, degraded reproducibility of the second original which is not in direct contact with a photosensitive material is observed. Of course, it is important to bring the color-separated original films and the photosensitive materials in tight contact with each other to keep flatness. For this purpose, in U.S. Ser. No. 285,937 described above, the interior of the covered region is subjected to vacuum suction to obtain flatness. However, even if flatness is satisfied, it is impossible to form a satisfactory color proof if collimated light cannot be obtained.

SUMMARY OF THE INVENTION

It is an object of the present invention to provide a compact contact exposure apparatus capable of performing image formation with high halftone reproducibility, i.e., with high gradation reproducibility for a halftone original.

In order to achieve the above object, a film original is overlaid on a photosensitive material, a transparent cover sheet is covered on the film original, the film original and the photosensitive material are brought into contact with each other by vacuum suction, and light emitted from a light source is radiated on the film original from the side of the cover sheet through a light collimating means to expose the film.

BRIEF DESCRIPTION OF THE DRAWINGS

FIG. 8A is a view showing an image reproduction effect when two originals are overlaid on a photosensitive material, and are irradiated with diffused light;

FIG. 8B is a view showing an image reproduction effect when two originals are overlaid on a photosensitive material, and are irradiated with collimated light.

DETAILED DESCRIPTION OF PREFERRED EMBODIMENT

A color proof formation apparatus assembled with an embodiment of a contact exposure apparatus according to the present invention will be described hereinafter.

Figure 1:
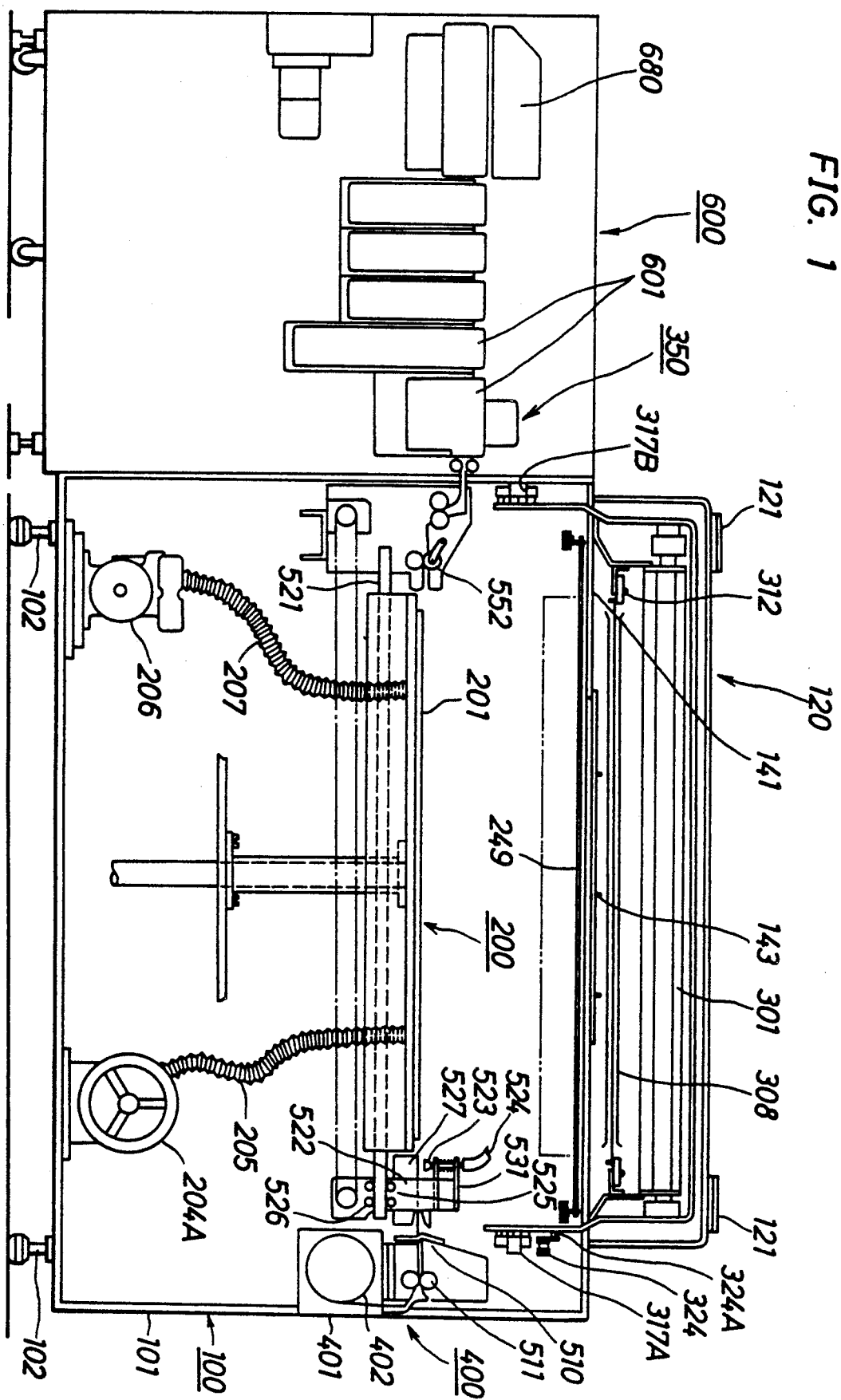
FIG. 1 is a front view of a color proof formation apparatus mounting an embodiment of a contact exposure apparatus according to the present invention.
Figure 2:
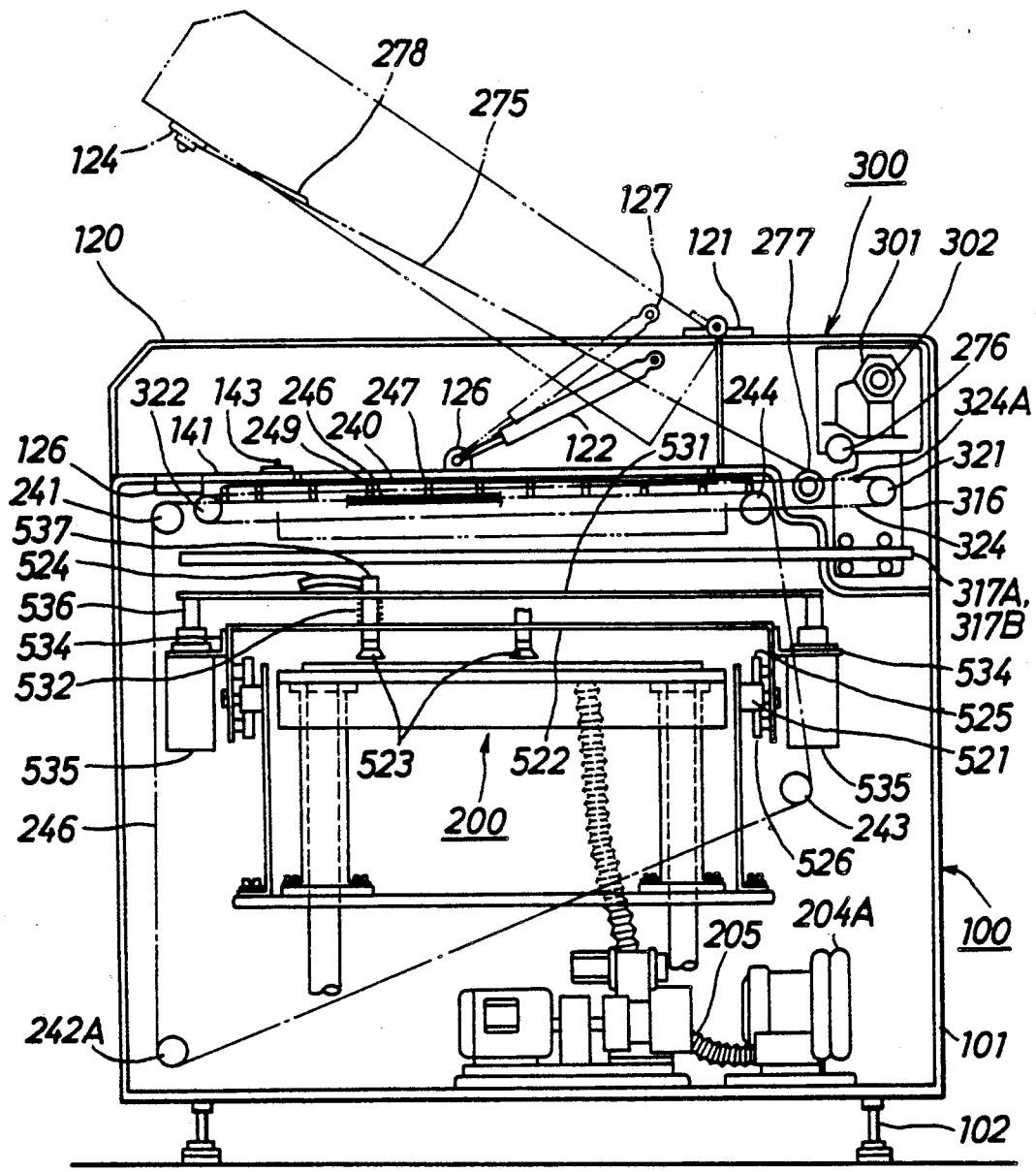
FIG. 2 is a side view of the color proof formation apparatus show FIG. 1.
Figure 3:
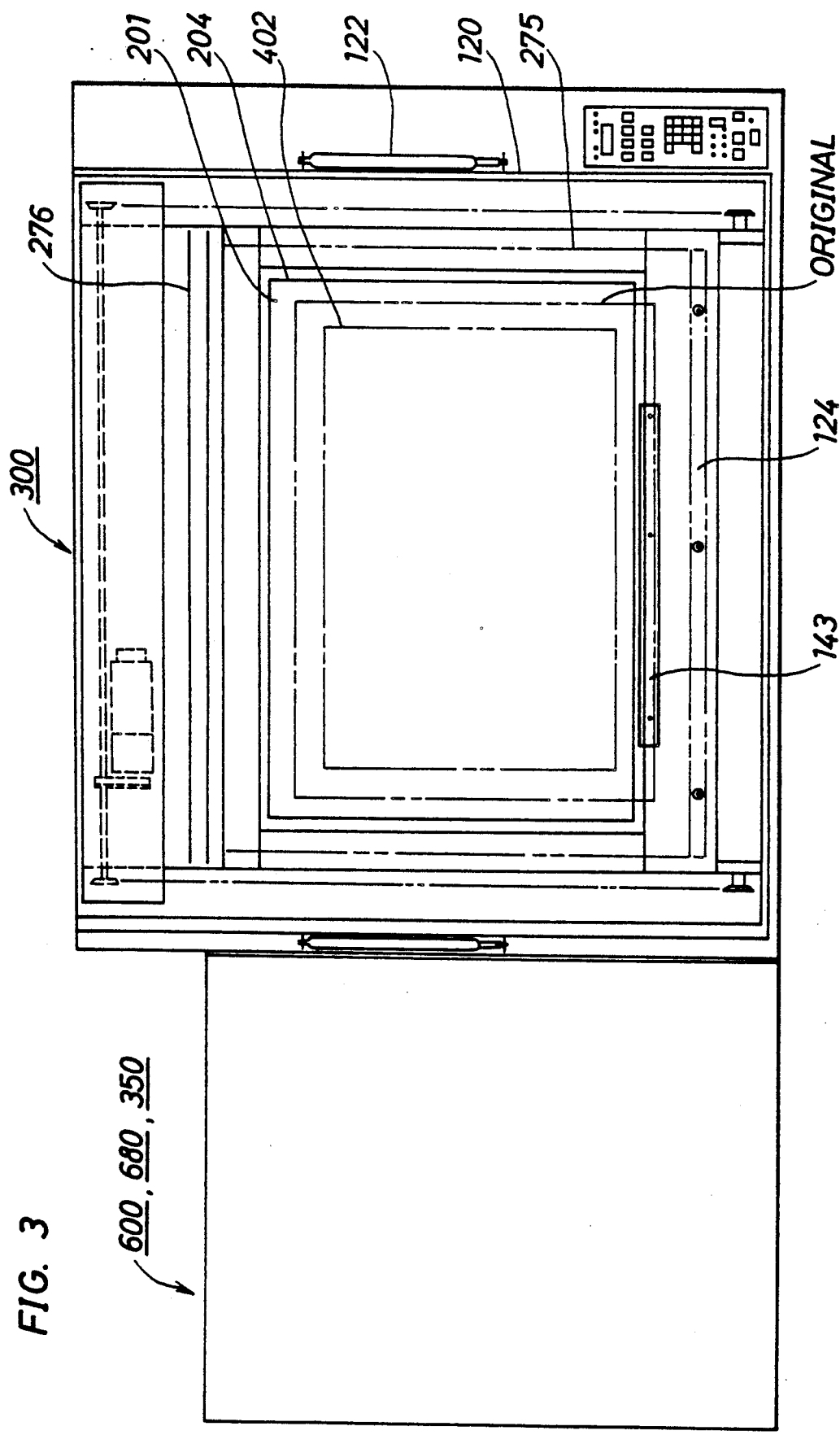
FIG. 3 is a plan view of the color proof formation apparatus shown in FIG. 1.
Figure 4:
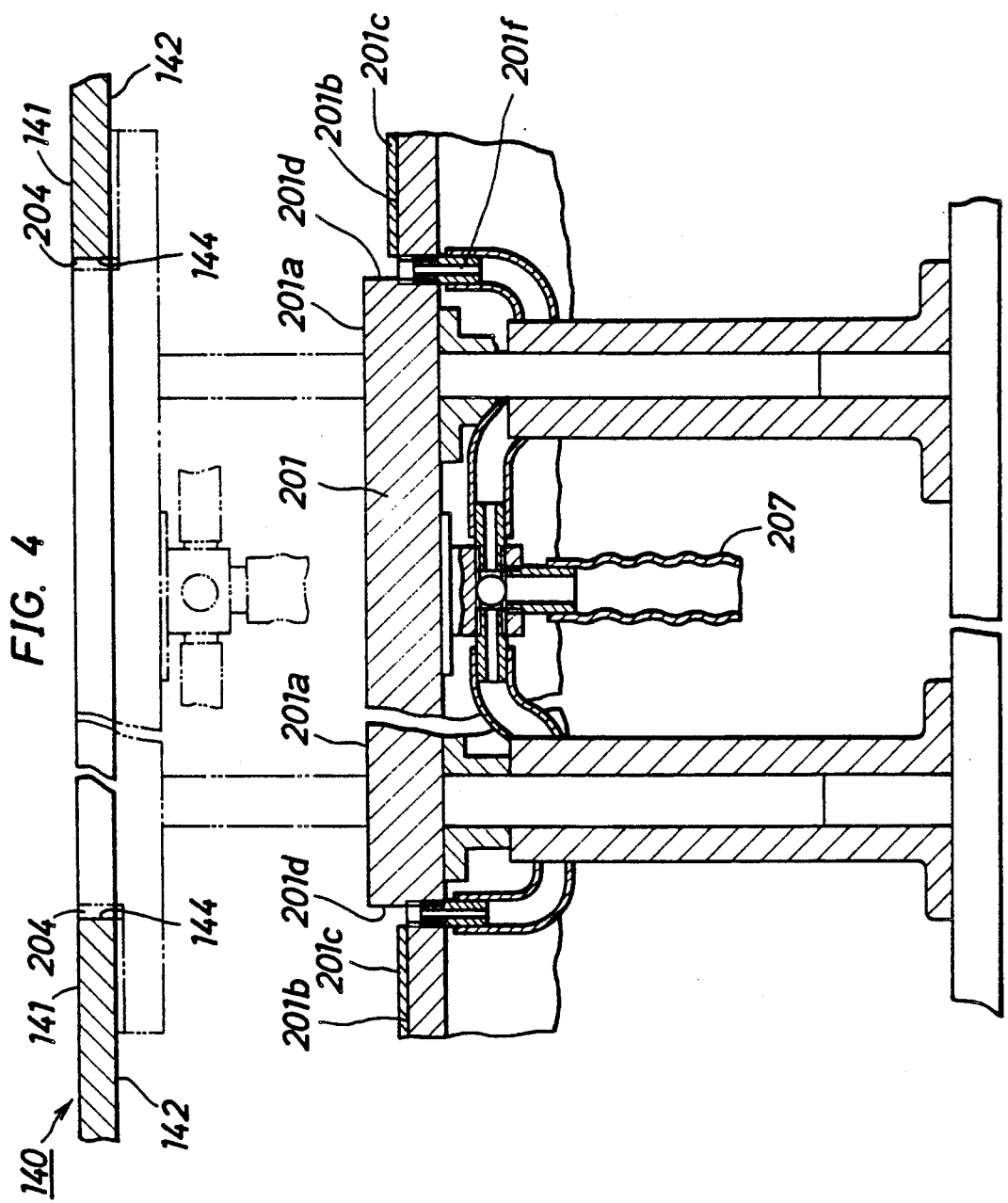
FIG. 4 is an enlarged side sectional view showing the positional relationship between an original table and a photosensitive material table of the color proof formation apparatus shown FIG. 1.

FIG. 1 is a front view of the color proof formation apparatus, FIG. 2 is a side view thereof, FIG. 3 is a plan view thereof, and FIG. 4 is a partial enlarged sectional view thereof.

As shown in FIG. 1, the color proof formation apparatus comprises a main body 100, and a development processing unit 600 arranged beside the main body 100. The main body 100 has an original table 140 (see FIG. 4) at an upper portion of a main body frame 101 supported by legs 102. The original table 140 has an upper surface 141 for placing an original positioning pin bar (registration pin) 143 and a lower surface 142. A light-shielding cover 120 which can form a darkroom as a first chamber is arranged on the original table 140 to be opened/closed through a hinge 121 and a gas damper 122 (see FIG. 2).

Figure 5:
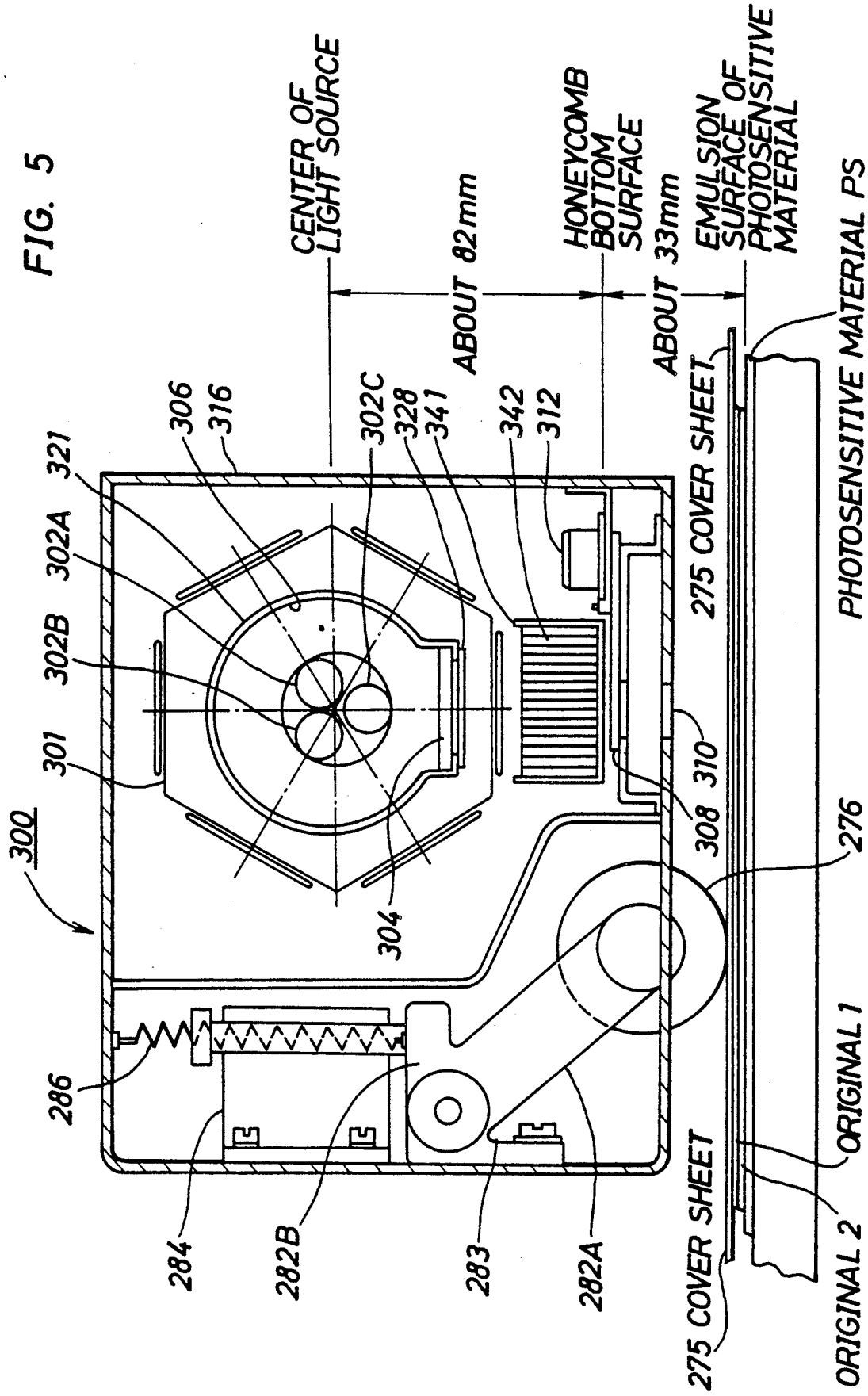
FIG. 5 is a sectional view of an exposure unit of the color apparatus.

An exposure unit 300 for exposure-scanning a contact-exposure surface of the original table 140 is arranged in the first chamber. As shown in FIG. 5, one or a plurality of (three in this embodiment) tubular light source lamps 302A, 302B, and 302C are arranged at the central portion of the exposure unit 300 to be surrounded by a drum-like inner surface reflecting mirror 306 fixed to a box member 316 and by a transmission window 304. A polygonal cylinder 301 having filters of B, G, R, ND, and the like on the respective cylinder surfaces is rotatably arranged in the central portion, so that filter surfaces and the transmission window 304 face the contact-exposure surface. Below the light source, the box member 316 includes a shielding plate 308, a rotary solenoid 312 for driving the plate 308, an exposure window, i.e., a slit 310, and a honeycomb board 342 fixed to the slit 310 and the shielding plate 308 on the side of the light source. The honeycomb board 342 is held in a holding frame 341 provided to the box member 316.

Figure 7A:
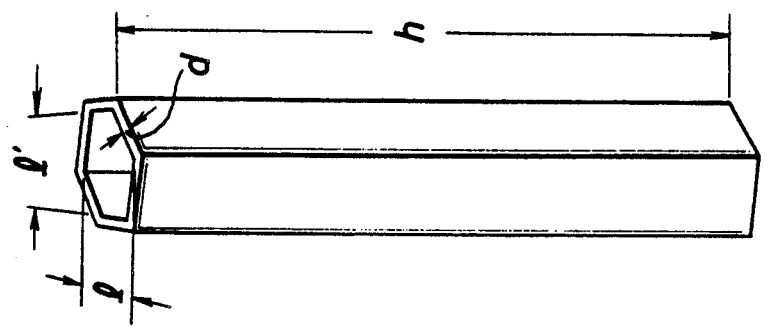
FIG. 7A is a partial perspective view of a honeycomb board.
Figure 7B:
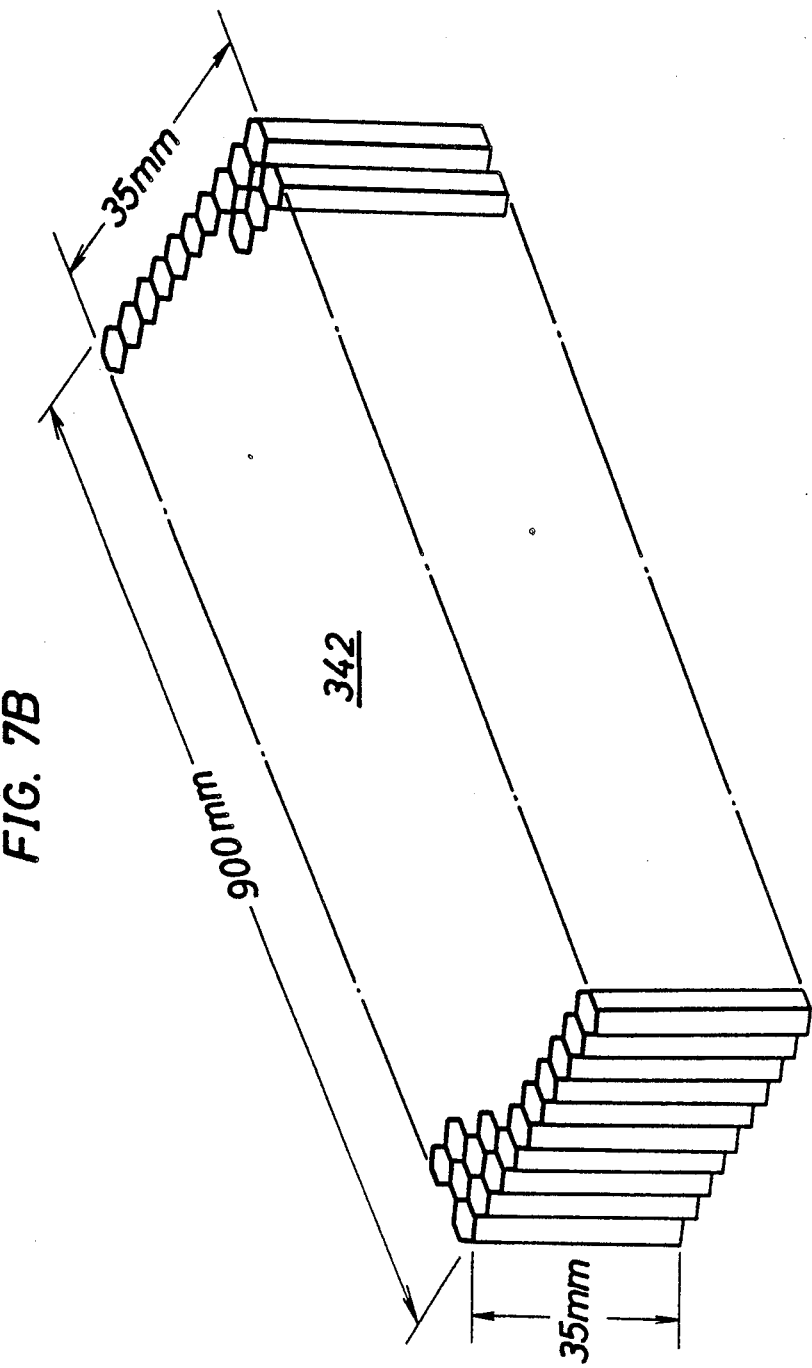
FIG. 7B is a perspective view of the overall honeycomb board.

The honeycomb board 342 is constituted by arranging hexagonal prisms each having a maximum diagonal distance l of about 4.6 mm, a minimum opposite side distance l' of about 3.1 mm, a thickness d of each side of about 0.5 mm, and a height, i.e., thickness h of about 30 mm (FIG. 7A) to constitute a honeycomb structure having a length of 900 mm or more and a width of 35 mm, as shown in FIG. 7B. The inner surface of each side is painted in flat black to provide a reflection preventing effect. Most of oblique light components of light emitted from the tubular light sources through the transmission window and the filters are absorbed by the black wall surfaces, and collimated light components and light components approximate to the collimated light components pass through the honeycomb board 342.

If the minimum opposite side distance l' or the maximum diagonal distance l is represented by L, a minimum incident angle θ at which light becomes incident on the honeycomb board 342 and can emerge therefrom is given by:

$$\theta = \tan^{-1}\frac{h}{L} \quad (0 \leq \theta \leq \pi/2)$$

The table below summarizes calculation values of the minimum incident angle θ to the honeycomb board 342 when the thickness h and distance L of the honeycomb board 342 are changed.

| h (mm) | θ°  l (maximum diagonal distance) = 4.6 mm | θ°  l' (minimum opposite side distance) = 3.1 mm |
|---|---|---|
| 10 | 65.8 | 72.3 |
| 20 | 77.3 | 81.2 |
| 30 | 81.5 | 84.1 |
| 40 | 84.9 | 85.6 |

As the thickness h of the honeycomb board is increased, the ratio of collimated light components is increased, thus improving halftone reproducibility. However, since an illuminance is lowered, an exposure time is prolonged.

In this manner, the shape, length, and thickness of each column of the honeycomb board are appropriately selected in correspondence with the types of light source, a maximum exposure size, an illuminance to a desired photosensitive material, and halftone reproducibility, so that a proper exposure state can be obtained. In this embodiment, since the honeycomb board has a thickness of about 20 to 30 mm, collimated light components can be incident at an incident angle of 81.5° to 84.1° with respect to the surface of the photosensitive material. Therefore, since most of oblique light components are shielded, when two or more originals are stacked, a line width of an original image can be prevented from being increased/decreased, and the original image can be formed as the first original. Thus, a contact exposure effect can be properly exhibited, and problems of formation of continuous dots or omission of dots can be prevented, thus realizing high-quality halftone reproduction, that is, image reproduction.

Figure 9:
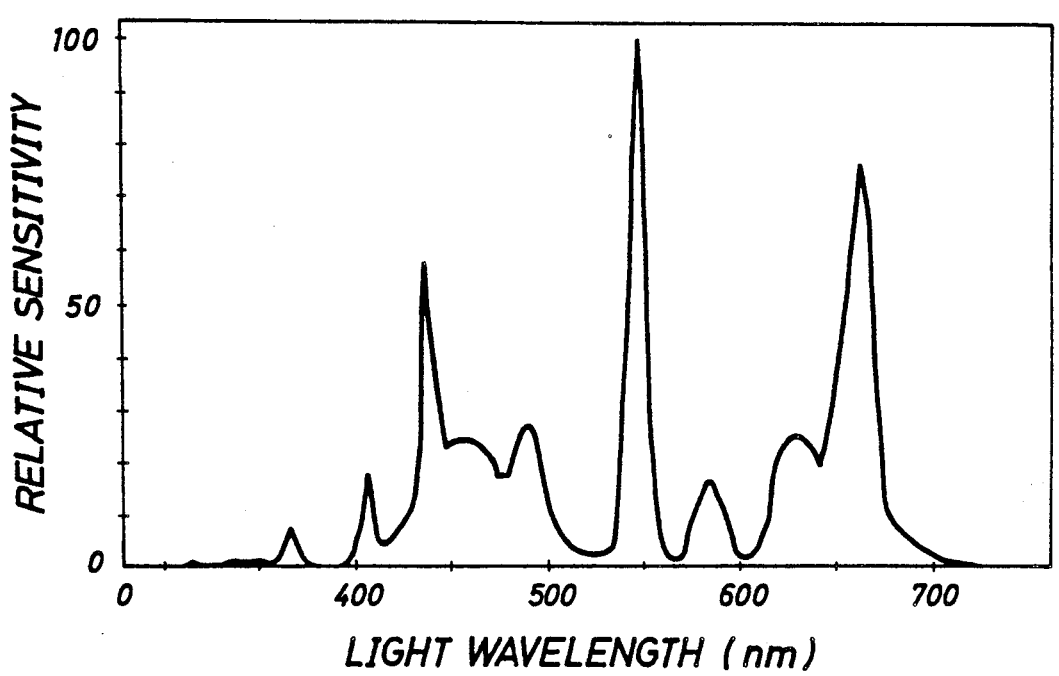
FIG. 9 is a graph showing a relative sensitivity as a function of a light wavelength.

The effect could be demonstrated when a color proof was formed using the apparatus of this embodiment. More specifically, positive type color paper KP-110P (available from KONICA CORP.) was used as a color photosensitive material, and a halftone scale tablet (150 lpi, and 5 to 95%) was used as an original. In addition, a 100-μ thick PET (polyethylene terephtalate) base was added between the photosensitive material and the halftone scale, so that two originals were stacked, thus preparing an original. Color-separation exposure was performed using, as a light source, a three-wavelength fluorescent lamp (available from TOSHIBA CORP.) having spectral wavelength characteristics shown in FIG. 9 through Kodak Wratten filters 47B (blue), 58 (green), and 25 (red). As an exposure time, a minimum exposure time upon which color development of yellow, magenta, and cyan ceases during exposure with each color-separated light was set. For example, a magenta image was obtained as follows. That is, exposure was performed with green light through the positive original film, and exposure was then performed with red light and blue light after the original was removed. Thereafter, predetermined second exposure, color development, de-silver bleaching, and a stabilization treatment were performed to obtain the magenta image. Table-1 below shows the relationship between an original halftone area of a magenta image and a reproduced halftone area of an image when two originals are stacked.

Table 1

| Number of Overlapping Originals | Image Reproduction Honeycomb Thickness (mm) | Original Halftone Area *1 | | |
|---|---|---|---|---|
| | | 10(%) | 50(%) | 90(%) |
| 1 | 20 | 8 | 48 | 88 |
| | 30 | 9 | 50 | 90 |
| | None | 4 | 42 | 82 |
| 2 | 20 | 8 | 46 | 86 |
| | 30 | 9 | 48 | 88 |
| | None | Not Reproduced | 35 | 79 |

*1 Measured by the halftone area measuring device SAKURA Areadac (available from KONICA CORP.)

The same measurement as for the magenta image was performed for yellow and cyan, and almost the same results were obtained.

As can be seen from the above description, when the honeycomb board 342 is mounted, the contact exposure effect can be properly exhibited, and high-quality image reproduction free from formation of continuous dots or omission of dots can be realized.

The exposure unit 300 can travel along rails 317A and 317B for scanning. The reciprocal movement of the exposure unit is performed by coupling by pins the box member 316 to a link 324A of a roller chain 324 looped between chain sprockets 321 and 322.

Therefore, light collimated by the honeycomb board 342 is then focused by the slit 310 to minimize the influence of diffused light as much as possible and to adjust a light amount. The honeycomb board 342 may be held to be in contact with the slit 310 or may be held to be separated therefrom. However, it is preferable that the honeycomb board 342 is arranged to be separated from the photosensitive material PS by a given distance. The preferable distance between the honeycomb board 342 and the photosensitive material PS is 30 mm or more. The width of the slit 310 is preferably small to minimize the influence or diffused light. The preferable slit width is 30 mm or less.

The positional relationship among the center of the light source, the bottom surface of the honeycomb board, and the photosensitive material PS of this embodiment is as shown in FIG. 5.

A photosensitive material mounting unit 200 as a second chamber is arranged in the main body frame 101. A photosensitive material mounting table 201 is driven by a motor (not shown) to be vertically movable.

Figure 6:
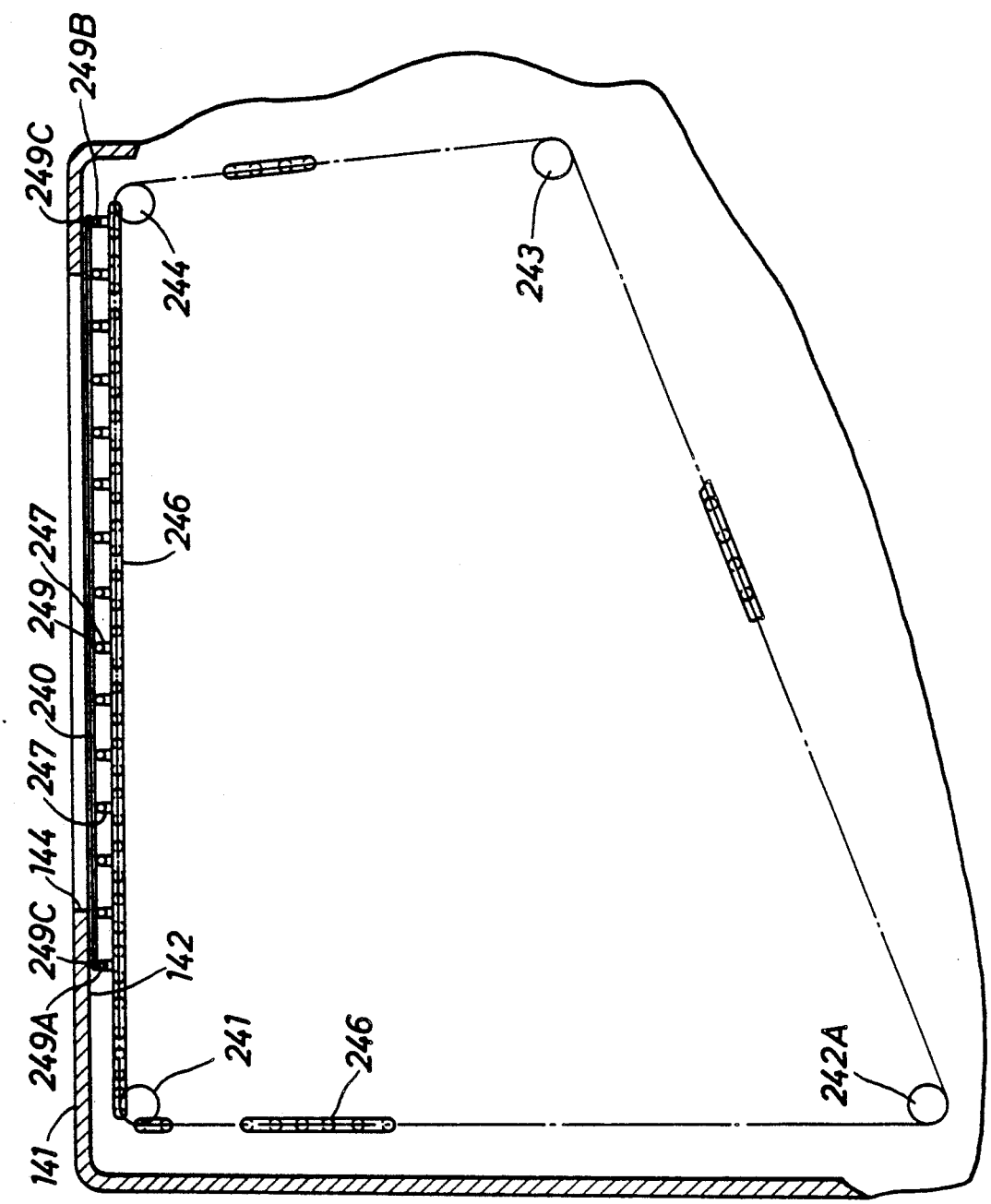
FIG. 6 is a partial enlarged view of FIG. 2.

As shown in FIG. 2 and FIG. 6 as the partial enlarged view of FIG. 2, a light-shielding curtain 240 is placed on rods 249 each of which is held at two ends by link attachments 247 of roller chains 246 symmetrically traveling at two sides and which are arranged at equal intervals. The leading and trailing ends of the curtain 240 are fixed to a start rod 294A and a tail rod 249B of the rods 249 by an adhesive or screws 249C. In this embodiment, as the light-shielding curtain 240, a Tetoron cloth is used as a core member, and its surface is coated with a nitrile rubber-based resin. The light-shielding curtain 240 has slight expandability. Thus, when the curtain 240 passes a sprocket 241, it absorbs a small increase in curtain orbit to allow a smooth operation. The light-shielding curtain 240 has an area larger than at least a cross-section of the photosensitive material mounting table moving region.

In this embodiment, the light-shielding curtain 240 shields an opening portion 144 while being held by many rods 249. Therefore, the light-shielding curtain 240 can be prevented from hanging down and its flatness can be almost kept. Therefore, an original mounting operation is facilitated. Furthermore, since the flatness is good, as described above, a light-shielding effect is high, and the area of the light-shielding curtain 240 need not be so large as compared that of the opening portion 144, thus assuring a complete light-shielding effect.

The roller chains 246 looped between the sprockets 241, 242A, 243, and 244 are reciprocally driven by a motor (not shown), so that the window (opening portion) 144 through which the photosensitive material mounting table 201 is fitted in the original table 140 can be opened or closed. The light-shielding curtain 240 travels along a plane at a level slightly lower than the lower surface 142 of the original table, i.e., a boundary region between the first and second chambers, so that formation and release of a light-shielded state of the second chamber storing the photosensitive material mounting table 201 with respect to the first chamber can be switched.

An elongated roll 402 of a silver chloride photosensitive material is loaded in a magazine 401 to form a photosensitive material loading unit 400. The starting portion of the photosensitive material roll 402 is fed by clamp rollers 511, and its leading end portion is registered at a cutter 510 to stand by. The leading end is further fed by the clamp rollers 511 to the left end of a fixing base 527 and chucked by suction disks 523. A movable head 522 having the suction disks 523 moves to and stops at a position at which a predetermined length of the photosensitive material is measured while rollers 525 and 526 are guided by rails 521 located at both the sides of the movable head 522. The photosensitive material is cut by the cutter 510 and moved so that the leading end is located at a predetermined position of the photosensitive material mounting table 201. After a suction force of the suction disks 523 of the movable head 522 is switched off, the movable head 522 returns to its home position.

Solenoids 535 are mounted at both the sides of the movable head 522 through brackets 534. A frame 531 is fixed to movable iron cores 536 of the solenoids 535. A holding pipe 537 of each suction disk 523 which is connected to a hose 524 is provided between the movable head 522 and the frame 531 so as to extend through a guide hole formed in the head 522 and the frame 531. The end portion in the thrust direction of the pipe 537 is fixed to the frame 531. The pipe 537 is arranged on the head 522 to be slidable along the hole, and is floated from the surface of the exposure table through a helical spring 532 inserted between the movable head 522 and the frame 531. When the solenoids 535 are energized and a suction valve is opened, the suction disks 523 are moved downward to vacuum-chuck the photosensitive material. Thereafter, the solenoids 535 are deenergized to move the suction disks 523 upward, thus conveying the photosensitive material.

When the photosensitive material is conveyed and placed on the photosensitive material mounting table 201 in this manner, a suction pressure is applied to suction holes formed on the photosensitive material mounting table through a flexible hose 205 by driving a blower 204A, and the photosensitive material is chucked on the photosensitive material mounting table 201. The chucked state is held until a plurality of exposure operations are completed, and conveyance of the photosensitive material to a developing unit is started.

In this state, since the light-shielding curtain 240 is located at a light-shielding position, the second chamber where the photosensitive material mounting table 201 is located keeps forming a darkroom.

The light-shielding cover 120 at the upper portion is opened upward to guide external light into the first chamber. In this state, positioning holes of a color-separated halftone original (the black plate and one of Y, M, and C plates, e.g., Y plate, or one or a plurality of Y, M, C, and black plates) are fitted on the registration pins (pin bars) 143 extending from the upper surface 141 of the original table 140. Most part of the original is placed on the light-shielding curtain 240 and the rods 249 for holding it.

In this state, the light-shielding cover 120 is closed so that the first chamber becomes a darkroom and is kept shielded from light. After the photosensitive material mounting table 201 is moved upward slightly below the surface of the light-shielding curtain 240, the light-shielding curtain 240 is moved to release the light-shielded state. When the first chamber where the upper surface 141 of the original table is located and the second chamber where the photosensitive material mounting table 201 is located form a common dark room, the photosensitive material mounting table 201 is moved upward to the same level as the exposure surface, i.e., a color-separated halftone original reference surface. At this time, an airtight packing 201c formed on an abutting surface 201b around the photosensitive material mounting table 201 in the second chamber is brought into tight contact with the lower surface 142 of the original table 140 in the first chamber, and a gap defined by a fitting surface 201d of the photosensitive material mounting table 201 into the opening portion 144 forms a suction groove 204. In addition, a portion between the surface of the original table, the original sandwiched between the surface of the photosensitive material mounting table and a transparent cover sheet 275, and the photosensitive material can be kept airtight.

One end of the transparent cover sheet 275 is fixed to a plate 124 detachably arranged near an opening defined when the light-shielding cover 120 is opened/closed, and the other end thereof is fixed to a tension member 277 provided in the first chamber below the hinge 121.

The tension member 277 may be a simple spring. In this embodiment, a torsion bar is fixed, and the cover sheet 275 is wound around it by one turn to be fixed thereto.

The torsion bar is biased by a torque spring in a direction to wind up the cover sheet 275.

In this manner, when the light-shielding cover 120 is opened or closed or in an intermediate state between the opened and closed states, a linear distance between the fixed positions of the two ends of the transparent cover sheet 275 absorbs geometrically different events, so that the cover sheet 275 can always be kept in a state approximate to a flat surface and in a state wherein it is applied with a uniform and appropriate tension.

When the light-shielding cover 120 is closed in the set state of the transparent cover sheet 275 described above, since the two ends of the cover sheet 275 are located at a level slightly lower than the surface of the original table, the transparent cover sheet 275 is urged against the surfaces of the original table 140 and the photosensitive material mounting table 201 on which the original halftone film and the photosensitive material are placed.

In this state, a squeeze roller 276 performs squeezing and air between the transparent cover sheet 275 and the original table 140 is evacuated by a reduced-pressure blower or a vacuum pump, thus keeping a high contact flat surface state.

In this embodiment, the squeeze roller 276 is provided to the exposure unit 300. When the light-shielding cover 120 is closed, the exposure unit 300 is reciprocally moved. During forward movement, neither squeezing nor exposure are performed. During backward movement, a movable iron core of a solenoid 284 is actuated on a portion 282B of a swing lever 282A which is pivoted about a rotating shaft of a mounting bracket 283 upon energization so as to urge the squeeze roller 276 against the transparent cover sheet 275, thus completing squeezing.

When no squeezing is performed, the solenoid 284 is deenergized, and a spring 286 functions to cause the squeeze roller 276 to float from the original mounting surface or the original table surface.

A window is formed on a region of the transparent cover sheet 275 near a portion where the cover sheet 275 is brought into contact with the registration pins 143, and a flexible rubber sheet 278 is adhered to and closes this portion, as shown in FIG. 2.

When the transparent cover sheet 275 is covered, the cover sheet surface can be prevented from being deformed or broken by the registration pins 143 and a satisfactory suction reduced-pressure effect can be achieved upon vacuum suction.

It is important to clean the transparent cover sheet 275. The plate 124 for fixing one end of the sheet 275 can be disengaged from the light-shielding cover 120, and contaminated upper and lower surfaces of the cover sheet can be easily wiped out.

The light-shielding cover 120 can be smoothly and lightly opened/closed since the two end portions of the gas damper 122 and pivotally supported on a bracket 126 of the main body and a bracket 127 of the light-shielding cover 120.

When squeezing is completed, a blower 206 as the reduced-pressure device is operated, and air present between the photosensitive material mounting table 201, the upper surface of the original table 140, and the transparent cover sheet 275 is evacuated through a suction hose 207 connected to a suction hole 201f formed in the photosensitive material mounting table 201 via the groove 204, so that the photosensitive material, the original, and the cover sheet 275 are kept in a flat contact state while overlapping each other. The suction hole 201f may be formed in the original table 140.

As shown in FIG. 4, the dimensional relationship between the abutting surface 201b, the airtight packing 201c adhered thereon and the lower surface 142 of the original table 140 is adjusted so that the upper surface 141 of the original table 140 and an upper surface 201a of the original table 201 are set at the same level. In this manner, air between the transparent cover sheet 275, the original table 140, and the photosensitive material mounting table 201 can smoothly flow through the groove 204, and the transparent cover sheet 275, the original, and the photosensitive material are brought into tight surface-contact with each other. The photosensitive material mounting table 201 may be located at a level slightly lower than the original table 140.

In this state, the exposure unit 300 travels along the guide rails 317A and 317B again to perform exposure scanning, thus completing color exposure of the first filter. Of course, the squeeze roller 276 is deenergized and floated so as not to interfere with exposure.

In order to perform image exposure using the second filter of another color, the photosensitive material mounting table 201 is moved downward to a position slightly below the travel path of the light-shielding curtain 240, and air is blown by a nozzle or the blower 206 is switched to a blow side to blow air into the groove 204. Furthermore, the light-shielding curtain 240 is closed, so that the original and the photosensitive material are easily and completely separated from each other. The order of the blowing by the blower and the downward movement of the photosensitive material mounting table 201 may be reversed or these operations may be performed at the same time. When the light-shielding cover 120 is opened, the first chamber is set in a bright room. However, the second chamber is kept shielded from light and forms a darkroom with respect to the first chamber.

The transparent cover sheet 275 whose one end is fixed to the light-shielding cover 120 is lifted obliquely upward simultaneously with an opening operation of the light-shielding cover 120, and is inevitably set in a state wherein the next film can be easily loaded.

In this state, the second original (the black plate and one of the Y, M, and C plates, e.g., M plate, or one a plurality of Y, M, C, and black plates) is set on the registration pins 143, and is covered with the light-shielding cover 120. Thereafter, the light-shielding curtain 240 is opened to move the photosensitive material mounting table 201 upward to the level of the surface of the original table 140. Thus, the transparent cover sheet 275 is automatically covered again, and the squeeze roller 276 attached to the exposure unit 300 is reciprocally moved to perform squeezing and to perform vacuum suction, so that the sheets are brought into tight contact with each other. The polygonal cylinder 301 is rotated to cause a cylinder surface with the second filter to face the exposure surface. Contact exposure scanning using the second color filter by moving the exposure unit is performed to complete the second exposure.

Similarly, exposure with the third original (the black plate and one of the Y, M, and C plates, e.g., C plate, or one or a plurality of Y, M, C, and black plates) and a corresponding filter is performed in the same procedure. Thus, the third exposure is completed. In this manner, one or a plurality of exposures are repeatedly performed as needed.

Finally, the photosensitive material mounting table 201 is moved to the lowermost position, and the photosensitive material is released from the tight contact state by releasing vacuum suction. The leading end of the photosensitive material is then fed to clamp rollers 552 by driving the suction disks 523.

The photosensitive material whose leading end has reached the clamp rollers 552 is fed to the development processing unit 600 on the left side. When an internal latent image direct positive photosensitive material is used, it is subjected to fogging exposure by a second exposure unit 350 during conveyance in a color development bath 601. The photosensitive material passes a bleaching/fixing bath and a stabilization bath, and is dried by a drying unit 680 while being conveyed. Thus, the processed photosensitive material is recovered at the left end of the unit.

When the exposed photosensitive material is started to be conveyed in the developing processing unit 600, and the surface of the photosensitive material mounting table becomes empty, the following photosensitive material is conveyed onto the photosensitive material mounting table 201. The following photosensitive material is measured, cut by the cutter 510, and set in a contact state. Thus, such processes are repeated as described above.

When an internal latent image direct positive photosensitive material is used, second exposure is necessary. However, when a negative color photosensitive material or a solarization type direct positive photosensitive material is used, no second exposure is required, and the second exposure unit is kept off. In addition, a photosensitive material of another type, e.g., a dye-bleaching type color photosensitive material or a color-reversal or diffusion-transfer photosensitive material can be similarly exposed/developed by a system using a processing bath corresponding to the photosensitive material.

The direct positive photosensitive material is exposed as follows. That is, a black plate is overlaid on each of originals of Y, M, and C plates, and a combination of Y and black plates is exposed using a B filter; the M and black plates, G; and the C and black plates, R, thereby performing three exposure operations. A conventional negative color photosensitive material is exposed as follows. Each of Y, M, and C plates of originals is solely overlaid on the photosensitive material. The B, G, and R filters are respectively overlaid on the Y, M, and C plates to perform three exposure operations. Furthermore, the black plate is overlaid, and fourth exposure is performed using an ND filter and a color filter for color correction if necessary, or triple exposure of B, G, and R is performed.

If necessary, additional exposure is performed using light corresponding to another separated color in addition to the above-mentioned color-separated exposure operations to form a fundamental color suitable for a printing ink. In order to blend light corresponding to different separated colors in advance, emission light of colors of B, G, and R may be blended or may be made using a combination of filters. Similarly, in order to reproduce a color suitable for a specific ink, so-called specific color, other than standard inks of Y, M, C, and black, exposure may be repeatedly performed, or emission light of different colors may be blended, or filters may be combined. In some cases, a color-separated halftone film called a special color plate must be used, or other films and the special-color color-separated halftone film must be combined. In addition, contact exposure may be performed while overlapping other color-separated halftone films.

The photosensitive material includes two types, i.e., high- and low-sensitive types. When the low-sensitivity photosensitive material is to be used, a plurality of light source lamps 302 of the polygonal cylinder 301 in the exposure unit 300 may be turned on to increase the intensity of exposure light.

By performing an operation of reducing a scanning rate and an operation of varying an opening ratio of the exposure window 310 solely or in a combination, exposure can be performed with high quality by properly satisfying contrary conditions.

In the above embodiment, as a light collimating means for collimating diffused light from an exposure light source, a honeycomb structure having a hexagonal opening has been exemplified. When the honeycomb structure has the hexagonal opening, a light loss can be minimized, and collimated light can be obtained. However, according to the present invention, the shape of the opening need not be hexagonal but may be other polygonal or circular shapes at the cost of a small increase in light loss. The dimensions of the opening and the thickness of the honeycomb board can be arbitrary selected in favor of design.

A contact exposure apparatus according to the present invention and a color proof formation apparatus using the same can perform a roomlight operation, and are rendered compact. When not one but a plurality of originals are stacked and are simultaneously subjected to exposure scanning, obliquely incident light components are shielded. Blurring or omission of dots can be prevented. Thus, halftone reproducibility, i.e., image gradation in contact multiple exposure of color-separated halftone original films for a photosensitive material can be improved. An image approximate to a printed material can be quickly formed on a color photosensitive material, and accurate original checking can be appropriately performed. Thus, a high-quality poster using the photosensitive material can be formed.

What we claim is:

1. A contact exposure apparatus wherein a film original is on a photosensitive material, a transparent cover sheet covers said original, said original and said photosensitive material are in contact with each other by vacuum suction, and said original is exposure-scanned by an exposure unit through said cover sheet,
   wherein said exposure unit comprises light collimating means for collimating light emitted from a light source, an original table in a first chamber which forms a bright room or a darkroom using an openable light-shielding cover, and
   a photosensitive material mounting table in a second chamber which is shielded from light by a light-shielding curtain.

2. An apparatus according to claim 1, wherein said light collimating means has a honeycomb structure.

3. An apparatus according to claim 2, wherein said honeycomb structure light collimating means has a hexagonal opening.

4. The apparatus of claim 2 wherein said honeycomb structure comprises a plurality of cells of hexagonal cross section, each of said cells having three pairs of opposed faces, adjacent said faces meeting in seams, there being a minimum distance between each of said pairs of faces and maximum distance between opposing pairs of said seams, inner sides of said faces being of non-reflecting color, whereby oblique components of light entering said cells are absorbed by said sides and are not emitted from said honeycomb.

5. The apparatus of claim 4 wherein said color is a flat black.

6. The apparatus of claim 1 wherein there are two superposed originals.

7. The apparatus of claim 2 wherein said honeycomb structure has a thickness of about 20 to about 30 mm.

8. The apparatus of claim 1 comprising an opening in said original table, a mounting table adapted for reciprocal vertical movement, said photosensitive material on an upper surface of said mounting table, said mounting table, in its uppermost position, fitting in said opening with said upper surface being substantially coplanar with a top surface of said original table.

9. The apparatus of claim 8 wherein said mounting table is provided with abutting surfaces at its periphery, said abutting surfaces adapted to contact the lower surface of said original table when said mounting table is in said uppermost position.

10. The apparatus of claim 9 wherein said abutting surfaces have packing thereon whereby said packing is pressed between said abutting surfaces and said lower surface when said mounting table is in said uppermost position.

11. The apparatus of claim 9 wherein there is a gap between said upper surface and said abutting surfaces through which vacuum is applied to said original, said cover sheet, and said photosensitive material.

12. The apparatus of claim 1 wherein said cover sheet is under tension.

13. The apparatus of claim 12 wherein said first chamber is formed by a light shielding cover which is pivotable at a point, said cover sheet being secured to said cover by an attachment.

14. The apparatus of claim 13 wherein said attachment is releasable.

15. The apparatus of claim 14 wherein said tension is provided by a tortion bar located below said point.

16. THe apparatus of claim 15 wherein said tortion bar is spring loaded in a direction away from said attachment.

17. The apparatus of claim 13 wherein said shielding cover pivots between an open position and a closed position, said cover sheet being pressed against said original and said photosensitive material when said shielding cover is in said closed position.

18. The apparatus of claim 1 wherein said exposure unit is provided with a squeeze roller which, when said shielding cover is in its closed position, transverses said cover sheet, said original, and said photosensitive material to remove air therefrom.

19. The apparatus of claim 1 wherein a pin bar is provided at one edge of said original table to aid in locating said original on said original table.

20. The apparatus of claim 19 wherein said cover sheet has a cutout corresponding to said pin bar, there being a flexible sheet attached to said cover sheet and filling said cutout.

21. The apparatus of claim 4 wherein said minimum distance is about 3.1 mm and said maximum distance is about 4.6 mm.

* * * * *